United States Patent
Mazzoleni et al.

(10) Patent No.: US 11,919,494 B2
(45) Date of Patent: Mar. 5, 2024

(54) METHOD FOR DETECTING MALFUNCTIONS OF AN ELECTRO-ACTUATED BRAKE APPARATUS OF A MOTOR VEHICLE

(71) Applicant: Freni Brembo S.p.A., Bergamo (IT)

(72) Inventors: Samuele Mazzoleni, Bergamo (IT); Massimo Di Stefano, Bergamo (IT); Alessandro Rossi, Bergamo (IT); Luca Cappelletti, Bergamo (IT)

(73) Assignee: Brembo, S.p.A., Bergamo (IT)

( * ) Notice: Subject to any disclaimer, the term of this patent is extended or adjusted under 35 U.S.C. 154(b) by 554 days.

(21) Appl. No.: 17/272,956

(22) PCT Filed: Aug. 7, 2019

(86) PCT No.: PCT/IB2019/056717
§ 371 (c)(1),
(2) Date: Mar. 3, 2021

(87) PCT Pub. No.: WO2020/049381
PCT Pub. Date: Mar. 12, 2020

(65) Prior Publication Data
US 2021/0276525 A1 Sep. 9, 2021

(30) Foreign Application Priority Data
Sep. 3, 2018 (IT) .................. 102018000008312

(51) Int. Cl.
*B60T 17/22* (2006.01)
*B60T 8/171* (2006.01)
(Continued)

(52) U.S. Cl.
CPC ............ *B60T 17/221* (2013.01); *B60T 8/171* (2013.01); *B60T 8/885* (2013.01); *B60T 13/745* (2013.01);
(Continued)

(58) Field of Classification Search
CPC ........ B60T 17/221; B60T 8/171; B60T 8/885; B60T 13/745; B60T 2250/04;
(Continued)

(56) References Cited

U.S. PATENT DOCUMENTS 9,988,024 B2 * 6/2018 Schwartz ............. G07C 5/0808
10,495,168 B2 * 12/2019 Serra ......................... G01L 1/16
(Continued)

FOREIGN PATENT DOCUMENTS

DE   102010040573 A1   3/2012
EP      3339120 A1   6/2018
(Continued)

OTHER PUBLICATIONS

European Patent Office, International Search Report and Written Opinion in application No. PCT/IB2019/056717, dated Oct. 22, 2019, 10 pages, Rijswijk Netherlands.

*Primary Examiner* — Richard M Camby
(74) *Attorney, Agent, or Firm* — Marshall & Melhorn, LLC

(57) ABSTRACT

A method for detecting malfunctions of a motor vehicle electro-actuated brake apparatus may include the steps of providing, in an electronic control unit, a functional control block and a first functional block having a numerical model representative of the electro-actuated brake caliper. The method may also include providing a target signal to the functional control block for generating the control signal to operate the electro-actuated brake caliper. The method may also include providing the target signal to the first functional block for generating a first signal. In the method, the first signal may be compared with a feedback signal for generating an error signal to be sent to the electronic control unit. Further, the method may include performing, by the second functional block, an error validation check to provide infor- (Continued)

mation on the operating state of the electro-actuated brake caliper to the electronic control unit.

12 Claims, 6 Drawing Sheets

(51) Int. Cl.
  *B60T 8/88*     (2006.01)
  *B60T 13/74*    (2006.01)
  *F16D 66/00*    (2006.01)
(52) U.S. Cl.
  CPC .......... *F16D 66/00* (2013.01); *B60T 2250/04* (2013.01); *B60T 2270/406* (2013.01); *B60T 2270/88* (2013.01); *F16D 2066/001* (2013.01); *F16D 2066/003* (2013.01); *F16D 2066/005* (2013.01)
(58) Field of Classification Search
  CPC ........... B60T 2270/406; B60T 2270/88; B60T 7/042; B60T 7/045; B60T 7/085; B60T 7/107; B60T 13/741; F16D 66/00; F16D 2066/001; F16D 2066/003; F16D 2066/005
  See application file for complete search history.

(56)     References Cited

U.S. PATENT DOCUMENTS

| 11,441,629 | B2* | 9/2022 | Solari ................... B60T 17/221 |
| 2011/0073423 | A1 | 3/2011 | Moon |
| 2018/0244159 | A1* | 8/2018 | Satterthwaite ............ B60T 8/30 |

FOREIGN PATENT DOCUMENTS

| FR | 2848171 A1 | 6/2004 |
| WO | 2012080024 A1 | 6/2012 |
| WO | 2012080085 A1 | 6/2012 |
| WO | 2014195093 A1 | 12/2014 |

* cited by examiner

METHOD FOR DETECTING MALFUNCTIONS OF AN ELECTRO-ACTUATED BRAKE APPARATUS OF A MOTOR VEHICLE

FIELD OF THE INVENTION

The present invention relates to a method for detecting malfunctions of an electro-actuated brake apparatus of a motor vehicle. In particular, the invention relates to a method for detecting malfunctions of an electromechanical or electrohydraulic brake apparatus of a motor vehicle following brake requests rapidly varying over time.

BACKGROUND ART

The braking system is an essential device for a motor vehicle, both in terms of safety and performance. It is important to be able to obtain an optimal braking capacity in a vehicle or motor vehicle, both in terms of stopping times and spaces and in terms of comfort and safety. In this regard, the need has recently arisen to develop electro-actuated brakes to be applied to vehicles. Such a technology goes under the name brake-by-wire (BBW).

Nowadays, the need is particularly felt to monitor the correct operation of an electro-actuated brake apparatus of a motor vehicle. Such monitoring indeed allows malfunctions or breakdowns of the brake apparatus to be detected and signaled in short periods of time, thus allowing a quick intervention to implement safety measures for the vehicle and the occupants thereof.

The monitoring of the correct operation of the brake system of vehicles has been the subject of various studies.

Patent document DE 102006031274 A1 describes a method for detecting a breakdown in one of the brakes of the wheels on a same axle of a motor vehicle. Such a method is configured to record the actual braking value of each brake during a monitoring period. The two recorded values are compared by an assessment unit to identify if a deviation therebetween with respect to a threshold value may be an indication of a breakdown in one of the two or in both brakes.

However, such a known solution has the drawback of always requiring, for the comparison, the acquisition of signals on the operating state of two different brakes under operating conditions.

Patent document US 20050253452A1 describes a method for detecting a malfunction in a brake system for each axle of a vehicle. The method performs the detection in two operating modes:

1) same pressure over the whole axle mode: the information is used of difference between brake pressure applied to the two wheels of a same axle and the percentage of variation of the pressure for detecting the malfunction;
2) different pressure over each wheel mode: it is specified that in this state, the detection of the malfunction is performed on the basis of the dynamic comparison of the pressure variations with respect to the average of the variation speeds on each wheel.

The method described in such a document has the drawback of requiring the performance of particularly complex operations.

Patent document US 20080246335A1 describes a method for detecting breakdowns which is applicable to a split brake system, in particular for detecting a malfunction in a hydraulic brake circuit which uses a pressure sensor in one of the two hydraulic circuits.

The detection is based on a comparison between the wheel speeds for each of the wheels of the split brake system and on the comparison between brake pressure measurement and vehicle deceleration.

However, such a solution is not applicable to brake systems other than a split brake system.

Therefore, the need is strongly felt to monitor the correct operation of the brake system, in particular of the electro-actuated type, of vehicles, which allows the limits and the drawbacks of the above-mentioned known monitoring methods to be overcome.

Solution

It is a first object of the present invention to devise and provide a method for detecting malfunctions of an electro-actuated brake apparatus of a motor vehicle which does not require acquiring signals on the operating state of two different brakes under operating conditions, thus being simpler than the known solutions.

Such an object is achieved by a method for detecting malfunctions of an electro-actuated brake apparatus of a motor vehicle, according to claim 1. Such a brake apparatus includes:
- an electronic control unit;
- an electro-actuated brake caliper electrically actuated by said electronic control unit for generating a clamping force on a disc of the brake apparatus in response to a control signal generated by the electronic control unit.

The method of the invention comprises the steps of:
- providing, in the electronic control unit, a functional control block and a first functional block consisting of a numerical model representative of the electro-actuated brake caliper;
- providing a target signal to the functional control block for generating said control signal to operate the electro-actuated brake caliper;
- providing said target signal to the first functional block for generating a first signal representative of a theoretical quantity associated with the numerical model representative of the electro-actuated brake caliper;
- comparing said first signal with a feedback signal representative of a real operating quantity associated with the electro-actuated brake caliper for generating an error signal to be sent to a second functional block of the electronic control unit;
- performing, by said second functional block, an error validation check to provide information on the operating state of the electro-actuated brake caliper to the electronic control unit.

It is a further object of the invention to provide a method for detecting malfunctions of an electro-actuated brake apparatus of a motor vehicle which may be adapted to the operating conditions of the electro-actuated brake.

Again, it is a further object of the invention to provide a method for detecting malfunctions of an electro-actuated brake apparatus of a motor vehicle in which the validation time of the malfunction may be adapted to the intensity of the error detected.

The present invention also relates to an electro-actuated brake apparatus according to claim 11 and to a motor vehicle including the aforesaid apparatus according to claim 12.

Certain advantageous embodiments are the subject of the dependent claims.

DRAWINGS

Further features and advantages of the method for detecting malfunctions of an electro-actuated brake apparatus will become apparent from the description provided below of preferred embodiments thereof, given by way of non-limiting examples, with reference to the accompanying drawings, in which.

In the aforesaid figures, equal or similar elements are indicated with the same numerals.

DESCRIPTION OF SOME PREFERRED EMBODIMENTS

Figure 1:
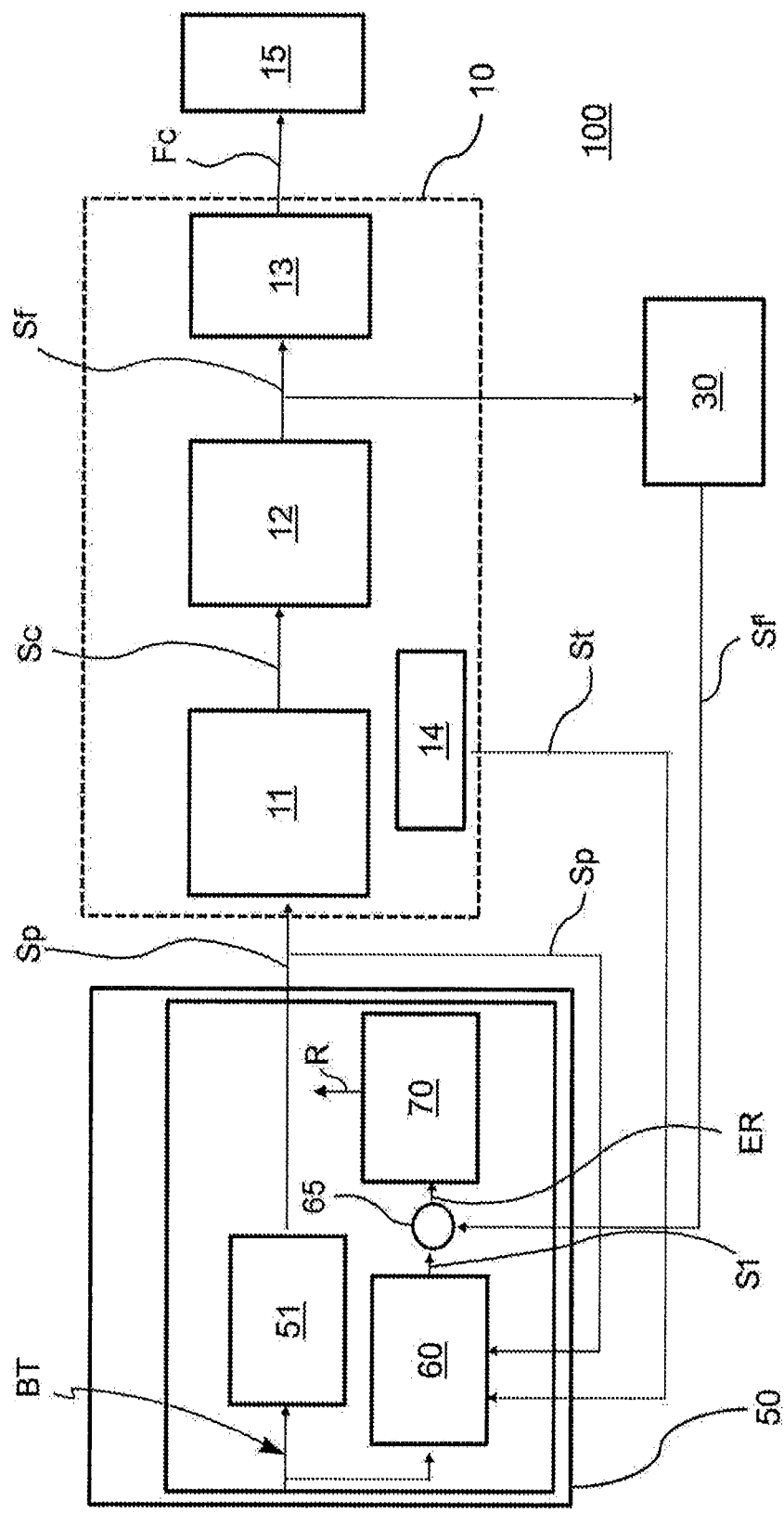
FIG. 1 shows a block diagram of an example of electromechanical brake apparatus comprising an electronic control unit operating according to the method of the present invention, connected to an electromechanical brake caliper.
Figure 2:
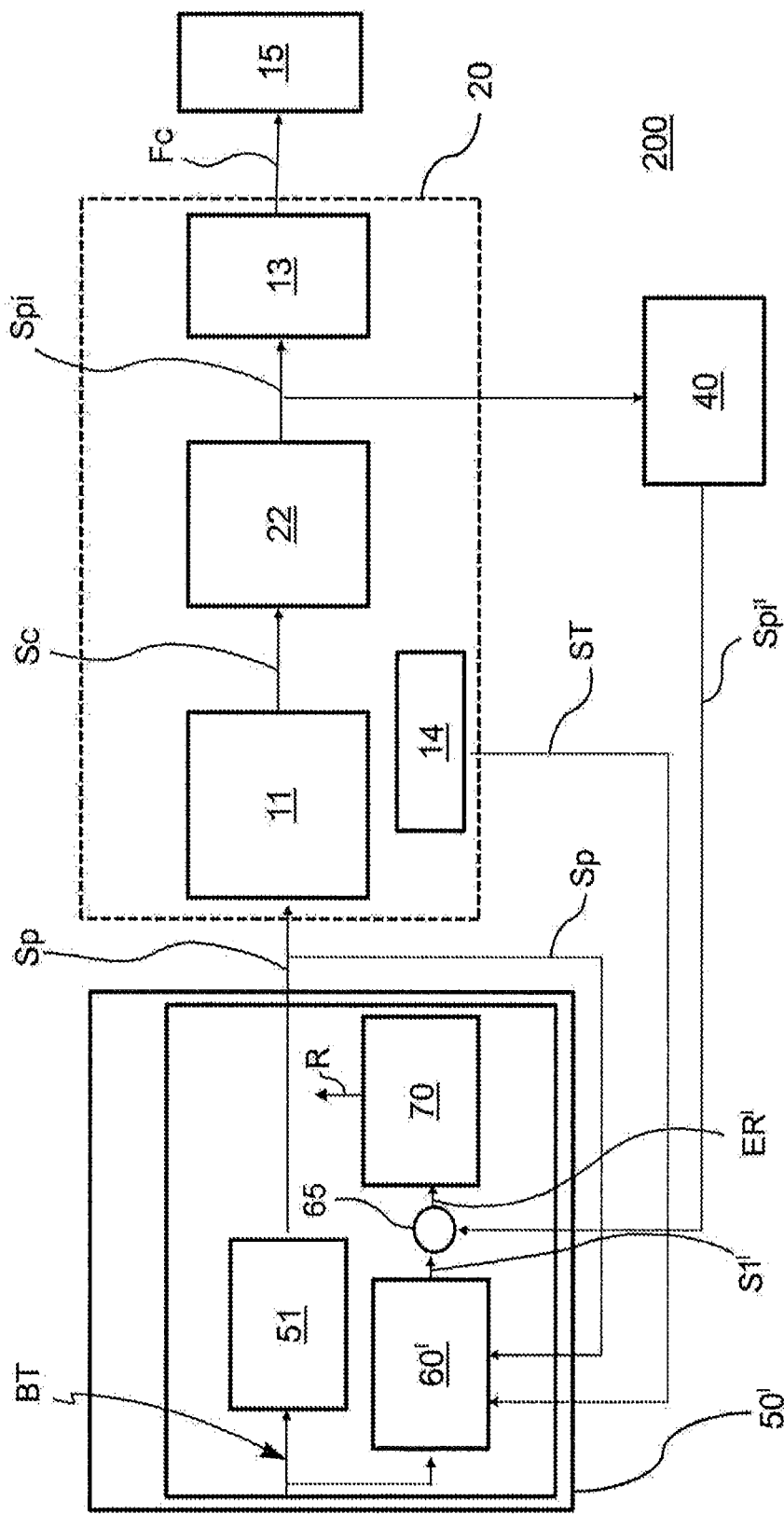
FIG. 2 shows a block diagram of an example of electrohydraulic brake apparatus comprising an electronic control unit operating according to the method of the present invention, connected to an electrohydraulic brake caliper.

With reference to FIGS. 1 and 2, a simplified block diagram of an electro-actuated brake apparatus for a motor vehicle which includes an electronic control unit 50, 50', operating according to the method of the present invention, connected to an electro-actuated brake caliper 10, 20 is indicated as a whole with numeral 100, 200.

In particular, the electro-actuated brake apparatus 100 in FIG. 1 is an electromechanical brake apparatus which comprises a respective electronic control unit 50 connected to an electromechanical brake caliper 10 for electrically actuating the aforesaid brake caliper 10.

Similarly, the electro-actuated brake apparatus 200 in FIG. 2 is an electrohydraulic brake apparatus which comprises a respective electronic control unit 50' connected to an electrohydraulic brake caliper 20 for electrically actuating the aforesaid brake caliper 20.

In greater detail, the electro-actuated brake caliper 20 comprises an electric engine block 11 configured for generating a drive torque or speed signal Sc starting from a control signal Sp, in particular an electric power signal, fed by the electronic control unit 50, 50'. Moreover, in the case of electromechanical brake caliper 10, the electro-actuated brake caliper 10 comprises a mechanical actuator block 12 configured to provide a force or speed signal Sf to a pad 13 of the brake caliper. The latter is adapted to generate and exert a clamping force Fc on disc 15 according to the force or speed signal Sf.

With reference to FIG. 2, in the case of electrohydraulic brake caliper 20, it is worth noting that the mechanical actuator block 22 also includes a respective hydraulic pump and is configured to provide a hydraulic pressure signal Spi to pad 13 of the brake caliper. The latter is adapted to generate and exert the respective clamping force Fc on disc 15 according to the hydraulic pressure signal Spi.

The electro-actuated brake caliper 10, 20 further comprises a temperature sensor block 14 configured to generate a signal ST indicative of the temperature of the brake caliper 10, Such a temperature signal ST may be provided to the electronic control unit 50, 50', as is clarified later.

Additionally, the electromechanical brake apparatus 100 in FIG. 1 comprises a force sensor block 30 configured to detect the above-mentioned force or speed signal Sf according to which to generate a respective force feedback signal Sf' to be fed to the electronic control unit 50.

Similarly, the electrohydraulic brake apparatus 200 in FIG. 2 comprises a pressor sensor block 40 configured to detect the above-mentioned hydraulic pressure signal Spi according to which to generate a pressure feedback signal Spi' to be fed to the electronic control unit 50'.

The electronic control unit 50, 50' of the electro-actuated brake apparatus 100, 200 consists of an electronic process control block, for example a microprocessor or a microcontroller, configured to receive in input the above-mentioned control signal Sp, temperature signal ST, force feedback signal Sf' or pressure feedback signal Spi'.

Such an electronic control unit 50, 50' stores, in a respective memory, an application software configured to actuate the malfunction detection method of the present invention. In particular, such an application software is implemented by means of functional blocks.

Figure 6:
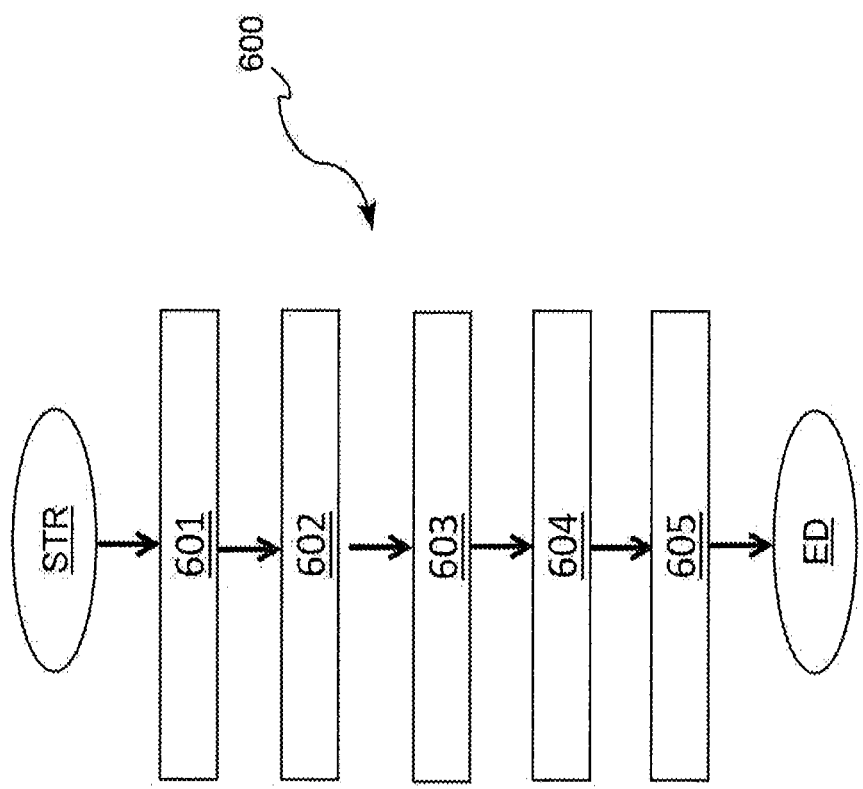
FIG. 6 shows a flow diagram of an algorithm of the method for detecting malfunctions of an electro-actuated brake apparatus of the present invention.

With reference to the flow diagram in FIG. 6, in particular, the electronic control unit 50, 50' of the brake apparatus implements the following steps of algorithm 600 of the malfunction detection method of the invention.

The malfunction detection method, hereinafter also simply method 600, comprises a symbolic start step STR and ends with a symbolic end step ED.

The method comprises a step 601 of providing, in the electronic control unit 50, 50', a functional control block 51 and a first functional block 60, 60' consisting of a numerical model representative of the electro-actuated brake caliper 10, 20, of the electromechanical or electrohydraulic type, respectively.

In other words, the first functional block 60, 60' is advantageously configured to replicate the operation of an electro-actuated brake caliper 10, 20 without breakdowns, i.e. under ideal conditions.

Moreover, the method comprises a step 602 of providing a target signal BT to the functional control block 51 for generating the above-mentioned control signal Sp to operate the electro-actuated brake caliper 10, 20.

The aforesaid target signal BT is representative for example, of a physical quantity associable with the brake caliper, chosen in the group consisting of: deceleration, speed, torque, force, pressure, position.

The method also comprises a step 603 of providing such a target signal BT to the first functional block 60, 60' for generating a first signal S1, S1' representative of a theoretical quantity associated with the numerical model representative of the electro-actuated brake caliper 10, 20.

Additionally, the method comprises a step 604 of comparing, for example in a comparison block 65, the aforesaid first signal S1, S1' with a feedback signal Sf', Spi' representative of a real operating quantity associated with the electro-actuated brake caliper 10, 20 for generating an error signal ER, ER' to be sent to a second functional block 70 of the electronic control unit 50, 50'.

In a particular example embodiment, with reference to the electro-actuated brake apparatus 100 in FIG. 1, such a feedback signal is the force feedback signal Sf generated by the force sensor 30 starting from the force or speed signal Sf applied to a pad 13 of the brake caliper 10.

In a different example embodiment, with reference to the electro-actuated brake apparatus 200 in FIG. 2, the feedback signal is the pressure feedback signal Spi' generated by the pressure sensor 40 starting from the hydraulic pressure signal Spi applied to a pad 13 of the brake caliper 20.

The comparison block 65 is configured for generating the error signal ER, ER' for example, by performing the difference between the first signal S1, S1' returned by the first functional block 60, 60' and the force feedback signal Sf' or the pressure feedback signal Spi' to be sent to a second functional block or error validation check block 70 (debouncing).

Additionally, the method comprises a step 605 of performing, by the second functional block 70, an error validation check to provide information R on the operating state of the electro-actuated brake caliper 10, 20 to the electronic control unit 50, 50'.

In other words, from the analysis of the error signal ER, ER', the validation block 70 is configured to provide information R indicative of possible breakdowns of the real electro-actuated brake caliper. The electronic control unit 50, is adapted to intervene to implement safety measures for the braking system on the basis of such operating state information R.

In a particular example embodiment of the invention, the method further comprises a step of providing, to the first functional block 60, 60', one or more further signals Sp, ST representative of a real operating condition of the electro-actuated brake caliper 10, 20.

In particular, such one or more further signals comprise the above-mentioned control signal Sp generated by the functional control block 51 starting from the target signal BT, and the temperature signal ST provided by the temperature sensor 14 associated with the electro-actuated brake caliper 10, 20.

Thereby, the method of the invention may advantageously be adapted to the operating conditions of the real electro-actuated brake 10, 20.

Figure 3:
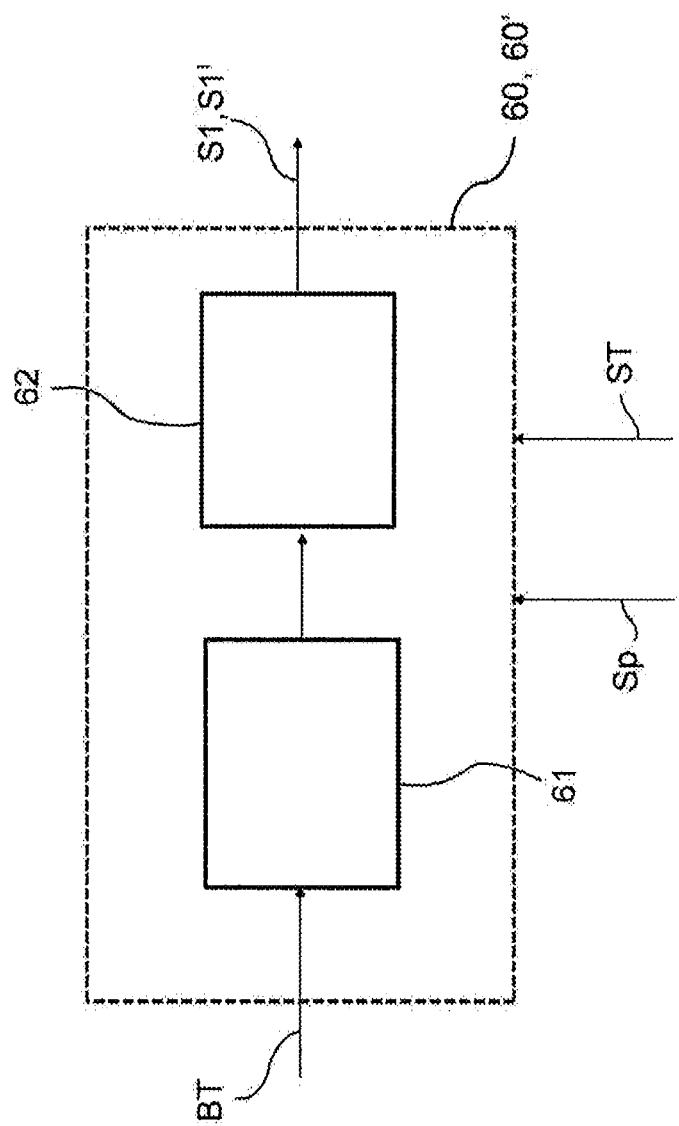
FIG. 3 shows a functional block diagram of an example embodiment of a numerical model of an electro-actuated brake caliper included in the electronic control unit in FIGS. 1 and 2.

A functional block diagram of an example embodiment of the numerical model representative of the real electro-actuated brake caliper 10, 20 which is included in the first functional block 60, 60' of the electronic control unit 50, 50', is shown in FIG. 3.

Such a numerical model particularly comprises a first portion 61 configured to simulate a real linear behavior of the electro-actuated brake caliper 10, 20 and a second portion 62 configured to simulate a non-linear behavior of the real electro-actuated brake caliper 10, 20.

In one example embodiment, the aforesaid first portion 61 of the module which simulates a linear behavior of the electro-actuated brake caliper 10, 20 is a numerical model of the ARX or ARMAX type, identified by bench tests at ambient temperature, of a type known to those skilled in the art.

The second portion 62 of the model considers non-linear behavior of the electro-actuated brake caliper 10, 20, such as the physical limits in implementation speed, for example. For example, such a non-linear portion 62 is a saturation on the maximum change speed at the output (rate limiter) configured to model the physical limits of the electric actuator both in application step and in release step of the disc clamping force.

It is worth noting that one or both the aforesaid first 61 and second 62 portions of the numerical model depend on the operating conditions of the physical actuator, such as the power supply voltage and the temperature, for example. Such information is received by means of sensors, as in the above-described example, or are estimated, to be adapted to the response of the real electro-actuated brake caliper 10, 20.

This dependence is modelled in the non-linear portion 62 of the model by means of a modification of the rate limiter according to the operating temperature and voltage of the actuator.

The error validation methods ER, ER' are implemented by the error validation check block 70 to avoid creating false signals or false positives on the operation of the electro-actuated brake caliper 10, 20.

Figure 4:
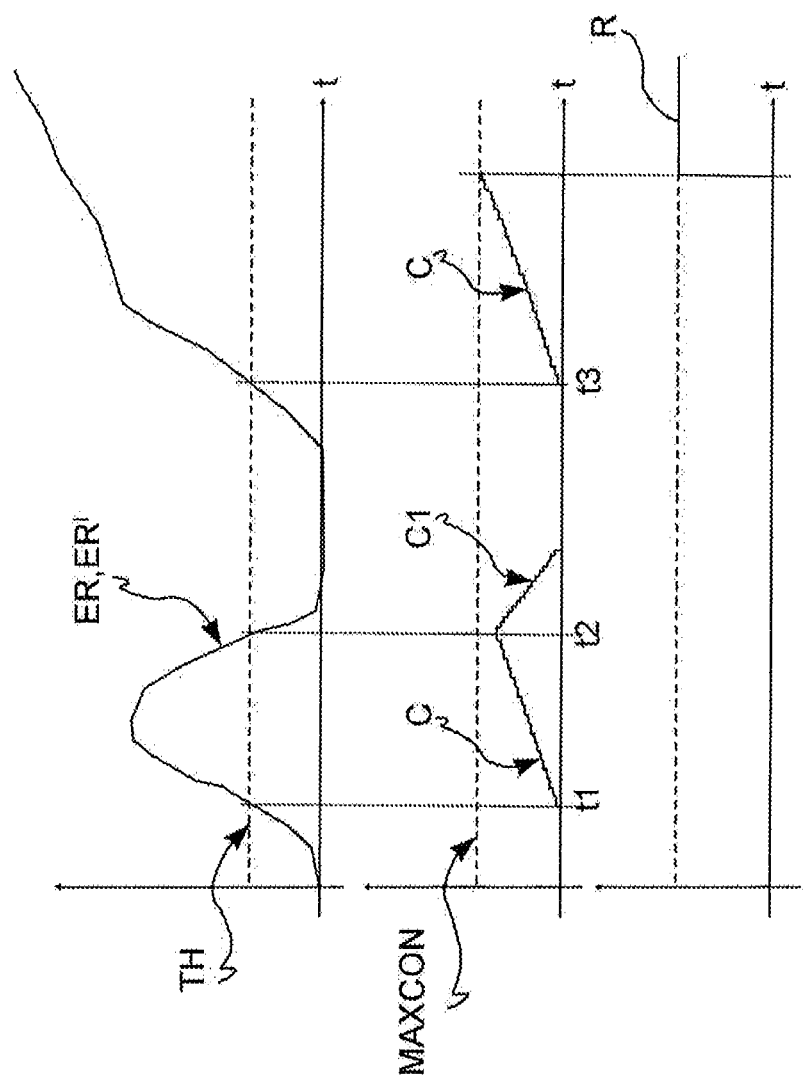
FIG. 4A shows, in a diagram according to time, a comparison between a continuous error signal detected in the electronic control unit in FIGS. 1 and 2 and a threshold signal, in a first example embodiment of the method of the invention.
FIG. 4B shows, in a diagram according to time, a first discrete count signal generated following the passing of the threshold value by the error signal in FIG. 4A.
FIG. 4C shows, in a diagram according to time, an example of a two-state signal generated following the reaching of a maximum reference value by the first count signal in FIG. 4B.

A first example embodiment of the error validation method comprised in the malfunction detection method of the invention is described with reference to FIGS. 4A, 4B, 4C.

Such a method comprises a first step of comparing the error signal ER, ER', for example a continuous time signal, with an error threshold TH which is constant over time.

Moreover, the method comprises a step of generating a first stepped count signal C, C1, which comprises:
  a first stepped signal portion C having an amplitude increasing over time from a first instant t1, t3, in which an amplitude of the error signal ER, ER' switches from a value which is lower than the error threshold TH to a value which is higher than such an error threshold,
  a second stepped signal portion C1 having an amplitude decreasing over time from a second instant t2, in which the amplitude of the error signal ER, ER' switches from a value which is higher than the error threshold TH to a value which is lower than the error threshold.

The method further comprises a step of comparing the amplitude of the first stepped count signal C, C1 with the amplitude of a constant maximum count signal MAXCON having predetermined amplitude for calculating a stay time of the error ER, ER' beyond threshold TH.

The method also comprises the step of generating the aforesaid information R on the operating state of the electro-actuated brake caliper 10, 20 when the amplitude of the first stepped count signal C, C1 equals the amplitude of the constant maximum count signal MAXCON.

Such an operating state signal R is for example, a two-state digital signal (0 logic and 1 logic) generated to signal, to the electronic control unit 50, 50', a breakdown of the electro-actuated brake caliper 10, 20.

It is worth noting that the amplitude value of the aforesaid maximum count signal MAXCON may be modified, e.g. reduced, if there is a desire for the validation block 70 to detect and signal variations of the error signal ER, ER' with respect to threshold TH, and therefore of operating state R, in advance.

Figure 5:
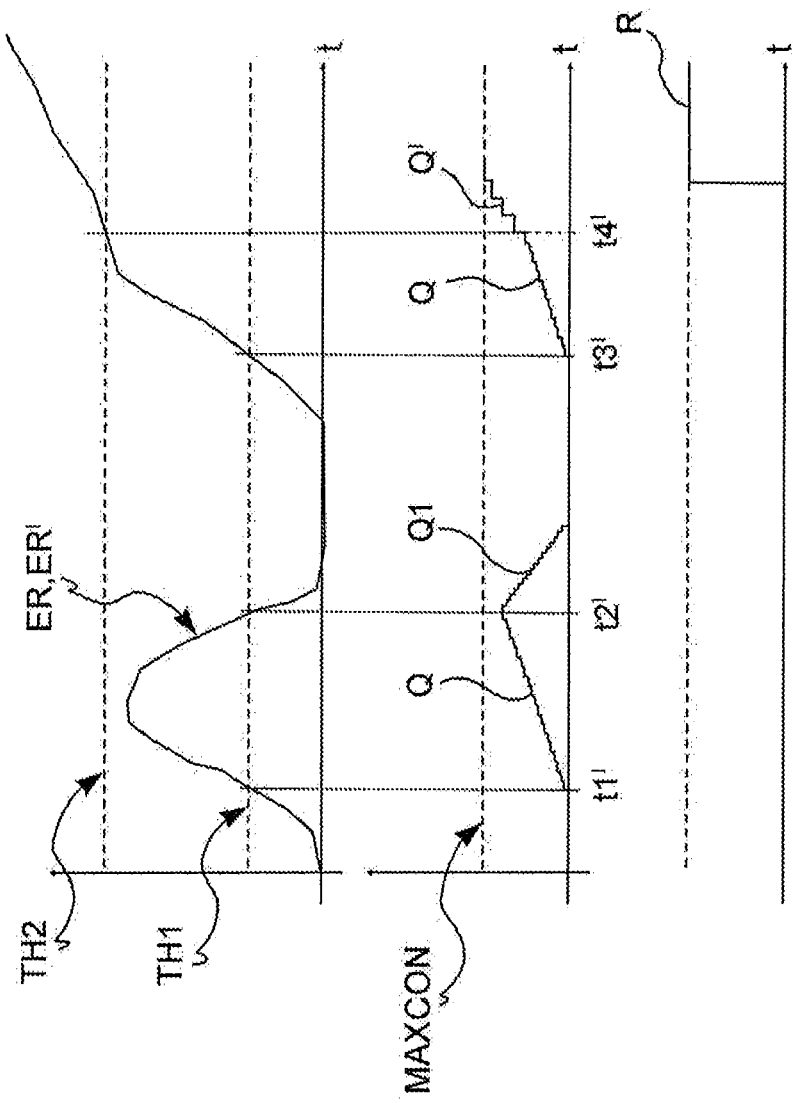
FIG. 5A shows, in a diagram according to time, a comparison between a continuous error signal detected in the electronic control unit in FIGS. 1 and 2 and a first and a second threshold signal, in a second example embodiment of the method of the invention.
FIG. 5B shows, in a diagram according to time, a second discrete count signal generated following the passing of the first and second threshold signal by the error signal in FIG. 5A.
FIG. 5C shows, in a diagram according to time, an example of a two-state signal generated following the reaching of a maximum reference value by the second count signal in FIG. 5B.

A second example embodiment of the error validation method comprised in the malfunction detection method of the invention is described with reference to FIGS. 5A, 5B, 5C.

Such a method comprises a first comparison step of the error signal ER, ER' with a first TH1 and a second TH2 error thresholds which are constant over time, in which the second threshold TH2 is higher than the first threshold TH1.

The method provides a step of generating a second stepped count signal Q, Q1, Q' comprising:
- a respective first stepped signal portion Q having an amplitude increasing over time from a first instant t1', t3', in which an amplitude of the error signal ER, ER' switches from a value which is lower than the first error threshold TH1 to a value which is higher than such a first error threshold,
- a respective second stepped signal portion Q1 having an amplitude decreasing over time from a second instant t2', in which the amplitude of the error signal ER, ER' switches from a value which is higher than the first error threshold TH1 to a value which is lower than such a first threshold,
- a respective third stepped signal portion Q' having an amplitude increasing over time from a third instant t4', in which the amplitude of the error signal ER, ER', having a value which is higher than the first error threshold TH1, switches from a value which is lower than the second error threshold TH2 to a value which is higher than such a second threshold. Moreover, each step of the third portion Q' of the stepped signal has a higher amplitude than the amplitude of the steps of the first Q or of the second Q1 portion. It is worth noting that the sampling time of the third portion Q' of the stepped signal remains unvaried and is equal to that of the first Q and second Q1 portion.

In other words, the error validation time is reduced with such a third portion Q' of the stepped signal when the second threshold TH2 is reached.

The method further comprises a step of comparing the amplitude of the second stepped count signal Q, Q1, Q' with the amplitude of a constant maximum count signal MAXCON having predetermined amplitude for calculating a stay time of the error ER, ER' beyond the aforesaid first TH1 and second TH2 thresholds.

Additionally, the method provides generating information R on the operating state of the electro-actuated brake caliper 10, when the amplitude of the second stepped count signal Q, Q1, Q' equals the amplitude of the constant maximum count signal MAXCON. In other words, the error validation time may be adapted by varying the amplitude of signal MAXCON or the amplitude of the steps of the second count signal Q, Q1, Q'.

Such an operating state signal R is generated to signal, to the electronic control unit 50, 50', a breakdown of the electro-actuated brake caliper 10, 20.

Similarly, several error thresholds may be defined in a further embodiment of the validation method of the invention, for example four error thresholds: TH1<TH2<TH3<TH4. On the basis of the entity of error ER, i.e. on the basis of the amplitude of error ER, the error validation time may be modified by varying the amplitude of the increasing steps of the count signal according to the following logic:
  if TH1<ER<TH2->count signal=count signal+increase 1,
  if TH2<ER<TH3->count signal=count signal+increase 2,
  if TH3<ER<TH4->count signal=count signal+increase 3,
  if ER>TH4->count signal=count signal+increase 4,
  in which the four increases in amplitude of the count signal are according to the following expression:
  increase 1<increase 2<increase 3<increase 4.

According to the aforesaid logic, if there is a high intensity malfunction in the brake caliper 10, 20 which may induce potential problems on the motor vehicle in a shorter period of time, the validation method performed by the validation block 70 may detect it more quickly.

In particular, the Applicant has proven that detection and recognition times of the breakdowns in the electro-actuated brake caliper 10, 20 may be obtained within the order of tens of milliseconds with the above-described method.

In other words, the method for detecting malfunctions of an electro-actuated brake apparatus 100, 200 of a motor vehicle of the invention has the advantage that the validation time of the malfunctions may be adapted according to the intensity of the detected error.

The present invention also relates to an electro-actuated brake apparatus 100, 200 which implements the malfunction detection method according to any one of the embodiments described above.

The present invention also relates to a motor vehicle which comprises the electro-actuated brake apparatus 100, 200 which implements the malfunction detection method according to any one of the embodiments described above.

Those skilled in the art may make many changes and adaptations to the embodiments described above of the method for detecting malfunctions of an electro-actuated brake apparatus of a motor vehicle or can replace elements with others which are functionally equivalent in order to meet contingent needs without however departing from the scope of the following claims.

What is claimed is:

1. A method for detecting malfunctions of an electro-actuated brake apparatus of a motor vehicle, the apparatus including:
   an electronic control unit;
   an electro-actuated brake caliper electrically actuated by said electronic control unit for generating a clamping force on a disc of the brake apparatus in response to a control signal generated by the electronic control unit,
the method comprising the steps of:
   providing, in the electronic control unit, a functional control block and a first functional block consisting of a numerical model representative of the electro-actuated brake caliper;
   providing a target signal to the functional control block for generating said control signal to operate the electro-actuated brake caliper;
   providing said target signal to the first functional block for generating a first signal representative of a theoretical quantity associated with the numerical model representative of the electro-actuated brake caliper;
   comparing said first signal with a feedback signal representative of a real operating quantity associated with the electro-actuated brake caliper for generating an error signal to be sent to a second functional block of the electronic control unit;
   performing, by said second functional block, an error validation check to provide information on the operating state of the electro-actuated brake caliper to the electronic control unit.

2. A method for detecting malfunctions of a brake electro-actuated apparatus according to claim 1, further comprising the step of providing to the first functional block one or more further signals representative of a real operating condition of the electro-actuated brake caliper.

3. A method for detecting malfunctions of an electro-actuated brake apparatus according to claim 2, wherein said one or more further signals comprise the control signal generated by the functional control block starting from the target signal and a temperature signal provided by a temperature sensor associated with the electro-actuated brake caliper.

4. A method for detecting malfunctions of an electro-actuated brake apparatus of a motor vehicle according to claim 1, wherein said feedback signal is a force feedback signal generated by a force sensor starting from a force or speed signal applied to a pad of the brake caliper.

5. A method for detecting malfunctions of an electro-actuated brake apparatus of a motor vehicle according to claim 1, wherein said feedback signal is a pressure feedback signal generated by a pressure sensor starting from a hydraulic pressure signal applied to a pad of the brake caliper.

6. A method for detecting malfunctions of an electro-actuated brake apparatus according to claim 1, wherein said step of performing the error validation check comprises the further steps of:
comparing the error signal with an error threshold which is constant over time;
generating a first stepped count signal comprising:
a first stepped signal portion having an amplitude increasing over time from a first instant, in which an amplitude of the error signal switches from a value which is lower than the error threshold to a value which is higher than the error threshold,
a second stepped signal portion having an amplitude decreasing over time from a second instant, in which the amplitude of the error signal switches from a value which is higher than the error threshold to a value which is lower than the error threshold,
comparing the amplitude of the first stepped count signal with the amplitude of a constant maximum count signal having predetermined amplitude for calculating a stay time of the error beyond the threshold;
generating the aforesaid information on the operating state of the electro-actuated brake caliper when the amplitude of the first stepped count signal equals the amplitude of the constant maximum count signal.

7. A method for detecting malfunctions of an electro-actuated brake apparatus according to claim 1, wherein said step of performing the error validation check comprises the further steps of:
comparing the error signal with a first and a second error thresholds which are constant over time, wherein said second threshold is higher than the first threshold;
generating a second stepped count signal comprising:
a respective first stepped signal portion having an amplitude increasing over time from a first instant, in which an amplitude of the error signal switches from a value which is lower than the first error threshold to a value which is higher than said first error threshold,
a respective second stepped signal portion having an amplitude decreasing over time from a second instant, in which the amplitude of the error signal switches from a value which is higher than the first error threshold to a value which is lower than said first threshold,
a respective third stepped signal portion having an amplitude increasing over time from a third instant, in which the amplitude of the error signal, having a value which is higher than the first error threshold, switches from a value which is lower than the second error threshold to a value which is higher than said second threshold, wherein the amplitude of each step of said third stepped signal portion is higher than the amplitude of the steps of the first or second portions;
comparing the amplitude of the second stepped count signal with the amplitude of a constant maximum count signal having predetermined amplitude for calculating a stay time of the error beyond the aforesaid first and second thresholds;
generating the information on the operating state of the electro-actuated brake caliper when the amplitude of the second stepped count signal equals the amplitude of the constant maximum count signal.

8. A method for detecting malfunctions of an electro-actuated brake apparatus according to claim 1, wherein the numerical model which implements the first functional block comprises a first portion configured to simulate a real linear behavior of the electro-actuated brake caliper and a second portion configured to simulate a real non-linear behavior of the real electro-actuated brake caliper.

9. A method for detecting malfunctions of an electro-actuated brake apparatus according to claim 8, wherein the first portion configured to simulate a linear behavior of the electro-actuated brake caliper is a numerical model of the ARX OR ARMAX type.

10. A method for detecting malfunctions of an electro-actuated brake apparatus according to claim 1, wherein said target signal is representative of a quantity chosen from the group consisting of: deceleration, speed, torque, force, pressure, position.

11. An electro-actuated brake apparatus of a motor vehicle, comprising:
an electronic control unit;
an electro-actuated brake caliper electrically actuated by said electronic control unit for generating a clamping force on a disc of the brake apparatus in response to a control signal generated by the electronic control unit,
said apparatus being configured to carry out the method for detecting malfunctions according to claim 1.

12. A motor vehicle comprising an electro-actuated brake apparatus according to claim 11.

* * * * *